United States Patent [19]
Corralejo

[11] Patent Number: 6,116,262
[45] Date of Patent: Sep. 12, 2000

[54] PLUMBING COUPLING AND METHOD OF USE

[76] Inventor: Gregory J. Corralejo, 22656 Devonshire, Saugus, Calif. 91350

[21] Appl. No.: 09/303,398

[22] Filed: May 1, 1999

[51] Int. Cl.[7] .............................. F16K 3/312; F16L 55/10
[52] U.S. Cl. ....................... 137/15.08; 138/94.3; 251/326
[58] Field of Search .......................... 137/15.08; 138/94, 138/94.3, 99, 162, 166, 169; 251/326

[56] References Cited

U.S. PATENT DOCUMENTS

| | | | |
|---|---|---|---|
| 1,150,141 | 8/1915 | Moore | 138/94.3 |
| 3,860,038 | 1/1975 | Forni | 138/94.3 |
| 4,155,574 | 5/1979 | Hulsey | 138/99 |
| 4,194,721 | 3/1980 | Nachtigahl | 138/94.3 |
| 5,524,663 | 6/1996 | Walsh et al. | 138/94.3 |

Primary Examiner—Kevin Shaver
Assistant Examiner—Eric Keasel
Attorney, Agent, or Firm—Ted Masters

[57] ABSTRACT

A plumbing coupling (20) for connecting two lengths of pipe (500) includes a cylindrical body (22) having a circumferential through-slit (32) extending part of the way around its perimeter (28). A closure plate (36) is selectively insertable into the through-slit (32) so as to abut the inner surface (24) of body (22) and block the flow of water through the plumbing coupling (20). A sleeve (42) is selectively wrappable around body (22) to tightly seal the closure plate (36). To conduct a pressure test, closure plate (36) is inserted and sleeve (42) attached. To return the plumbing line to normal use, middle portion (43) of sleeve (42) is peeled back, closure plate (36) is removed, and middle portion (43) of sleeve (42) is reattached. Body (22) is fabricated from a resilient material which conforms to edge (38) of closure plate (36).

2 Claims, 8 Drawing Sheets

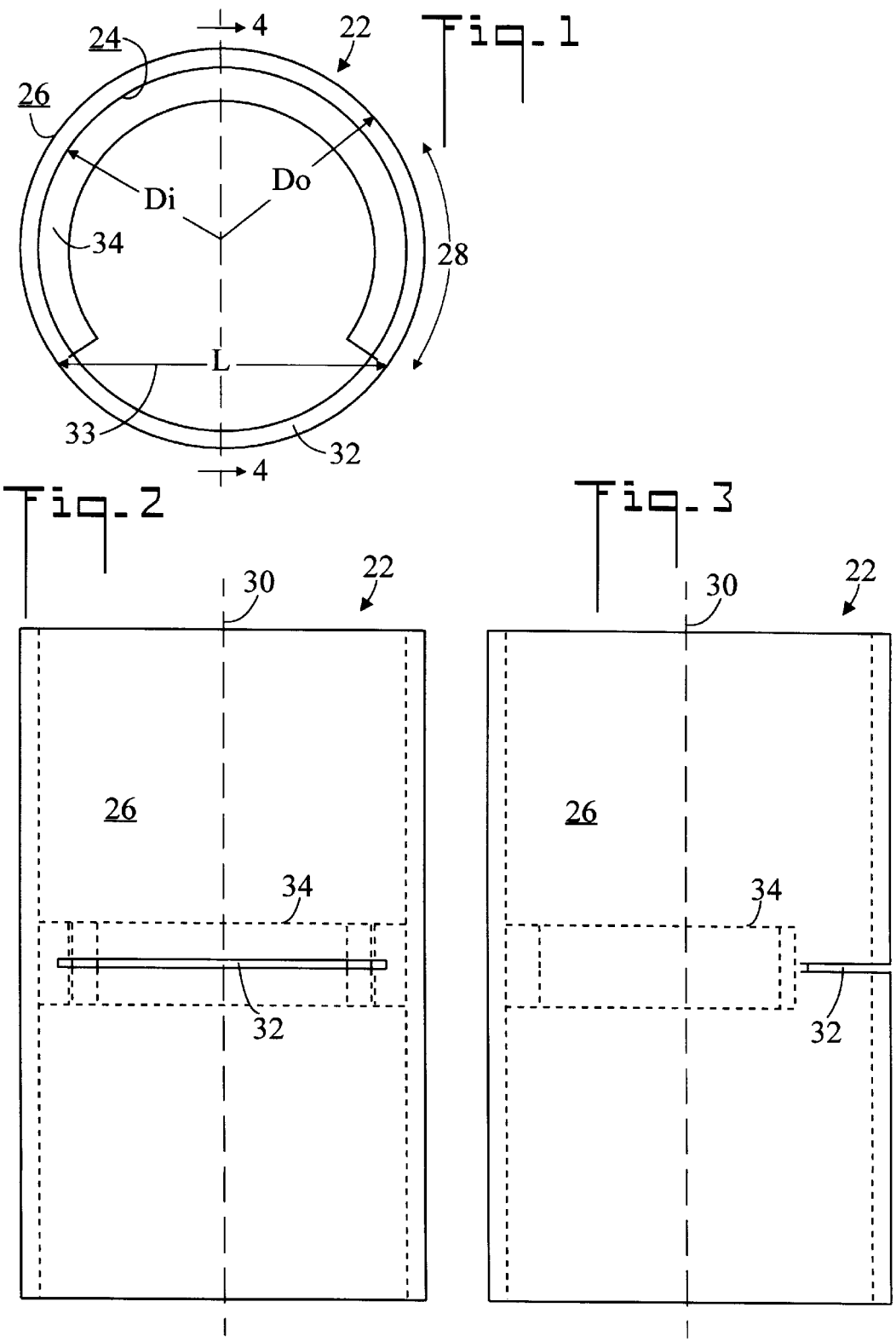

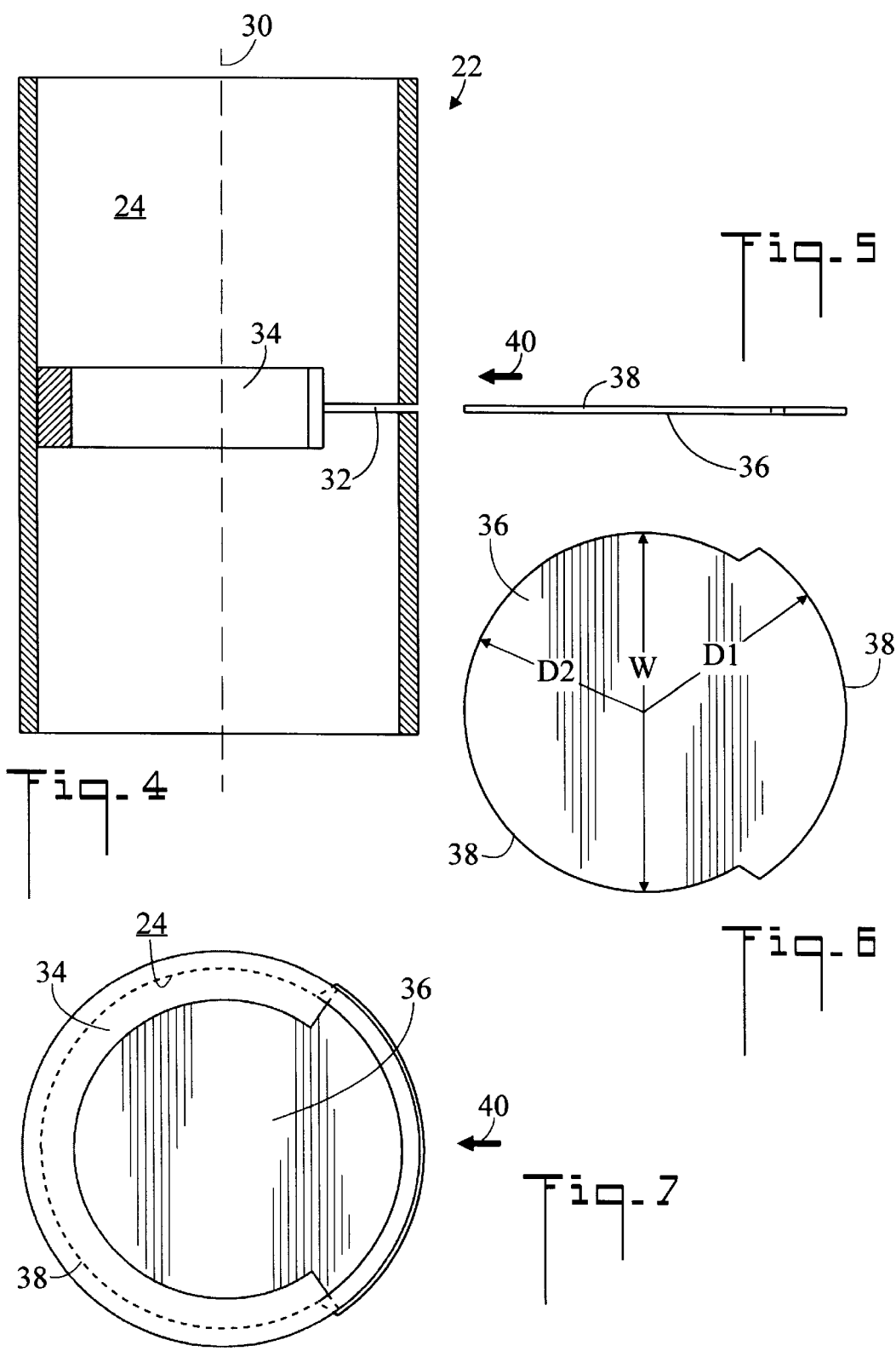

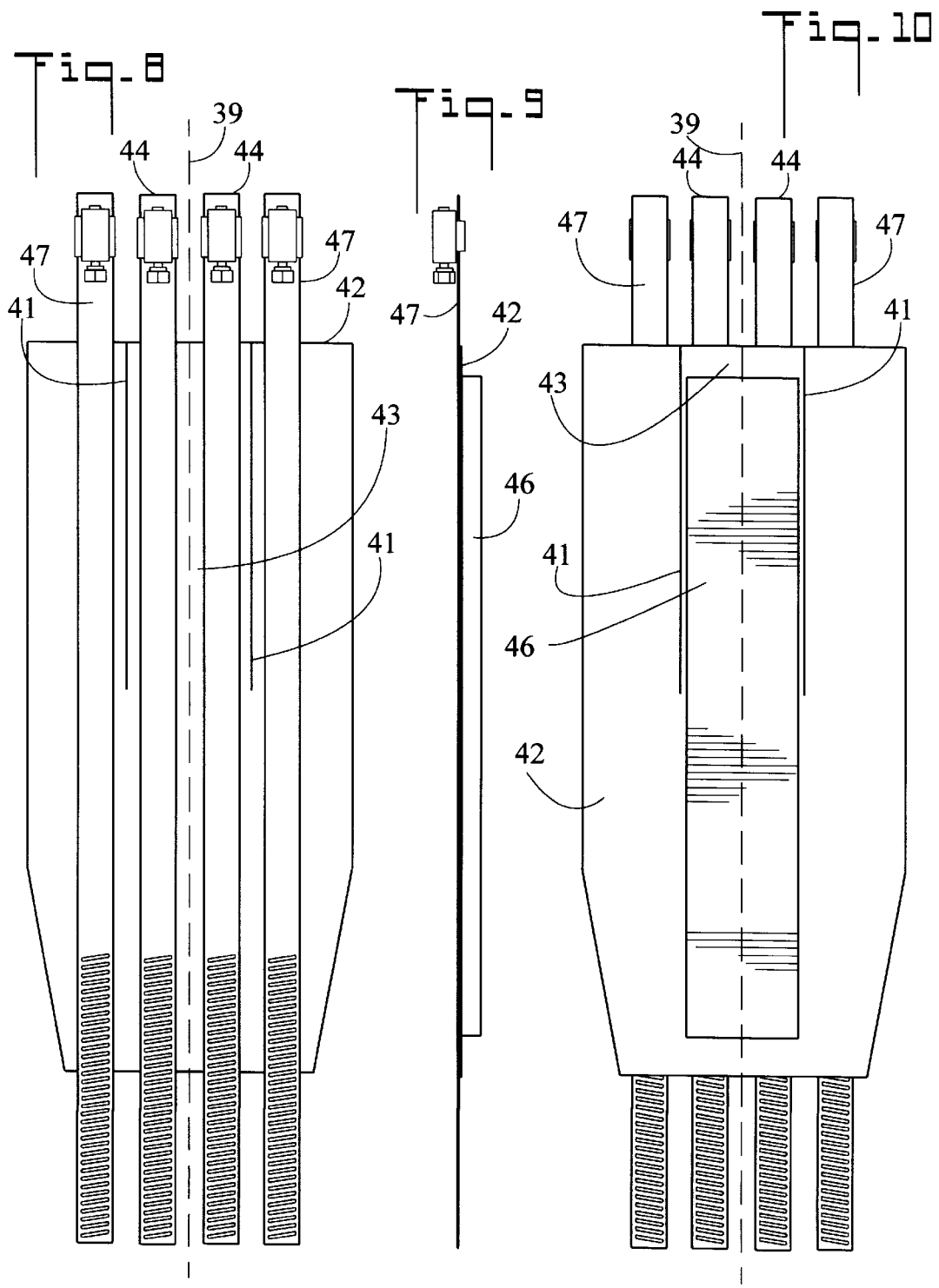

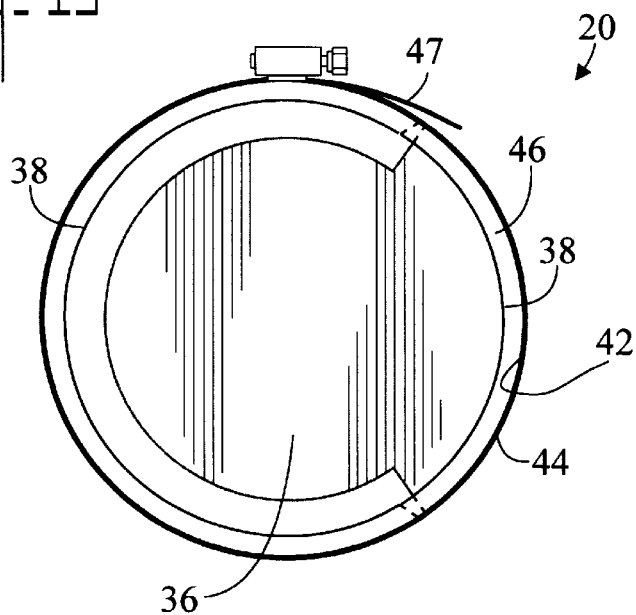
Fig_15
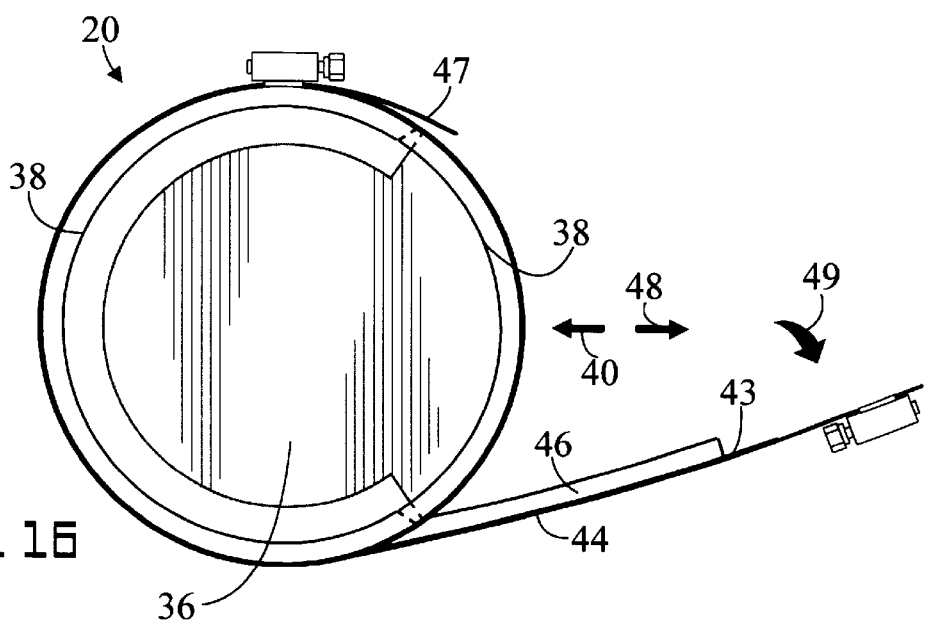
Fig_16

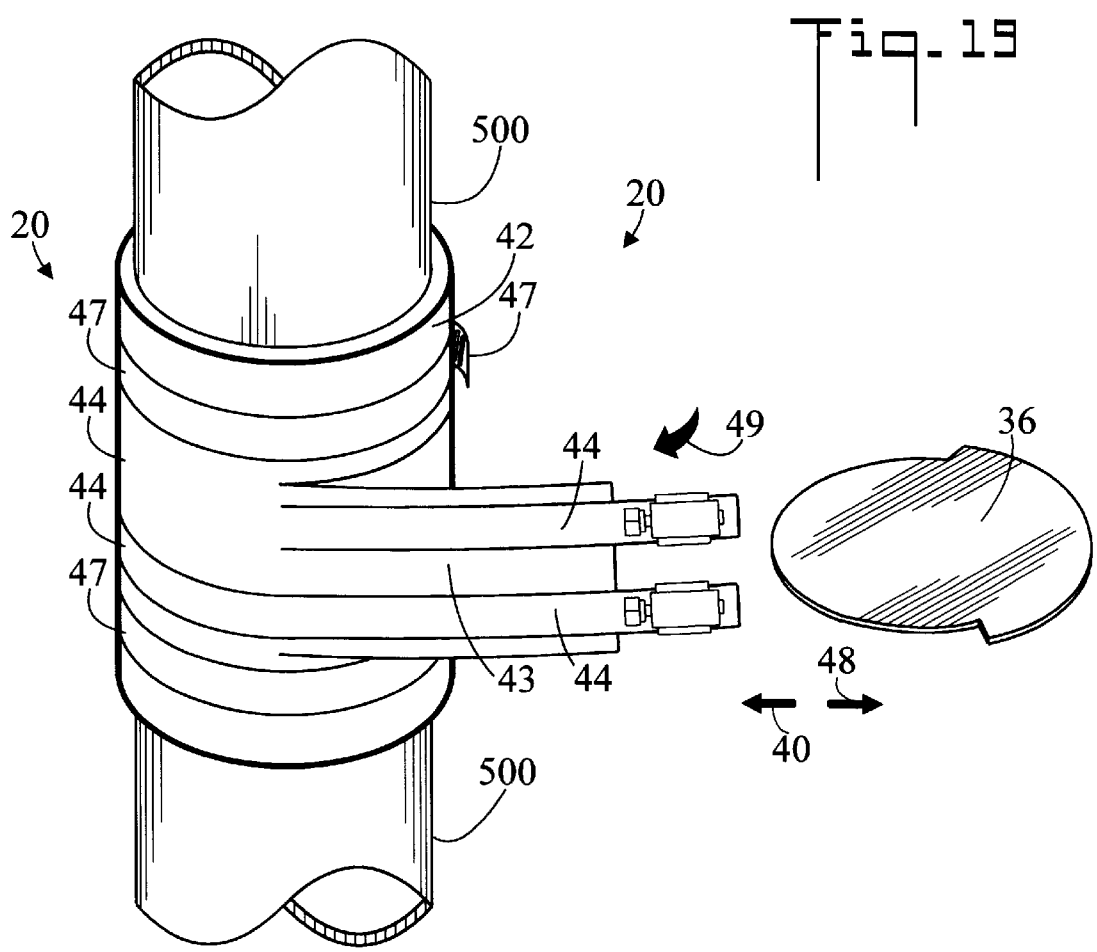

PLUMBING COUPLING AND METHOD OF USE

TECHNICAL FIELD

The present invention pertains generally to plumbing, and in particular to devices which are utilized to test plumbing drainage systems.

BACKGROUND ART

Test fixtures for the pressure testing of plumbing drainage or vent pipes and stacks are well known in the art. As required by building codes in the installation of plumbing systems, particularly waste or vent pipes in buildings, it is necessary to pressure test the pipes for leaks. The present method is to cut the pipe an temporarily insert a complicated test valve arrangement (called a "wye" having a "double test plug") which blocks the pipe. A head of water is then applied upstream of the valve, and the drainage line is checked for leaks. After the test, the test valve must be removed and replaced with a permanent coupling. This procedure is troublesome in that the test valves are expensive and tend to wear out frequently, and the process is labor intensive by virtue of the necessary cut, insertion, removal, and permanent coupling installation steps.

Prior art devices which address the temporary closure of pipe systems include U.S. Pat. No. 2,645,244 which shows a close-off device for pipe lines which is useful in cleaning the pipe system. A disc-like sealing device is temporarily inserted in the line. The sealing device has grooves or channels which allow impurities to be purged from the system. U.S. Pat. No. 4,194,721 illustrates a plumbing test fitting for waste or vent pipes. The fitting has a closure plate adapted to be slidably fitted between a pair of spaced adjacent ends of a pair of pipes, the joint being sealed by a detachable sealing clamp which also bears against the periphery of the closure plate. A sliding valve element having an operating stem which extends outwards between the pipes and through the sealing clamp can be operated to open or close a passage in the closure plate so as to enable the pipe to be closed for testing and thereafter opened to permit testing fluid to escape down the pipes. The device must be removed after the completion of testing and replaced with a permanent coupling. U.S. Pat. No. 4,429,568 describes a closure plug assembly for pressure testing liquid drain and vent plumbing pipe systems. The device includes a T or Y test section with a test opening which compresses a cap subassembly, sealing means for releasably securing the cap sub-assembly across the test opening, and a plug such as an inflatable bulb or plate removably insertable in the plumbing system.

DISCLOSURE OF INVENTION

The present invention is directed to a plumbing coupling which can be used to pressure test conventional plumbing drainage lines, and which can remain in the line after testing. The invention permits a plumber to quickly and inexpensively install the coupling and test the system, and then return the system to its normal configuration. The coupling uses a resilient cylindrical body to connect two pipes. The body has a through-slit which extends part way around its perimeter. A flat closure plate is inserted into the through-slit to block the flow of water through the body. A metal sleeve connects around the body and installed closure plate to both strengthen the joint and tighten the watertight seal. At the completion of testing, the sleeve is removed, the closure plate is withdrawn, and the sleeve is reattached around the body, the sleeve and body permanently remaining as a part of the drainage system.

The present invention is easy to install in a drainage system, and will hold water throughout the period of testing and inspection. Furthermore, after test by extracting the closure plate, the water used for testing can be released without creating an unwanted mess. The present invention will save time and labor costs compared to the test fixture and method that is presently being used in the plumbing trade.

In accordance with a preferred embodiment of the invention, a plumbing coupling includes a substantially cylindrical body having an inner surface, an outer surface, an outer perimeter, and a longitudinal axis. The body includes a through-slit or slot which is oriented substantially perpendicular to the longitudinal axis. The through-slit extends only part way around the outer perimeter. A closure plate having an edge can be inserted into the through-slit so that the inner edge of the closure plate compressibly abuts the inner surface of the body thereby preventing water from flowing through the body.

In accordance with an important aspect of the invention, the through-slit extends between one-half and one-fourth of the way around the outer perimeter of the body.

In accordance with an important feature of the invention, the body is fabricated from a resilient material such as rubber. The closure plate is wider than the through-slit so that the through-slit longitudinally stretches as the closure plate is inserted.

In accordance with another important aspect of the invention, the body has an outer diameter. A first outer portion of the closure plate has a diameter slightly greater than the outer diameter of the body, and a second inner portion of the closure plate has a diameter less than the outer diameter of the body.

In accordance with another important feature of the invention, a sleeve having a compressible seal is selectively connectable around the perimeter of the body so that the seal compressively abuts the outer edge of the closure plate.

In accordance with an important aspect of the invention, the inner surface of the body includes a compressible circumferential lip which compressively engages the inner edge of the closure plate. The lip circumferentially extending around the inner surface to meet the through-slit.

In accordance with an important feature of the invention, the sleeve has two slits which define a middle portion which can be separately peeled back to allow removal of the closure plate after pressure testing.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a top plan view of the cylindrical or pipe-shaped body of a plumbing coupling in accordance with the present invention;

FIG. 2 is a front elevation view of the body;

FIG. 3 is a side elevation view of the body;

FIG. 4 is a cross sectional view along the line 4—4 of FIG. 1;

FIG. 5 is a side elevation view of a closure plate:

FIG. 6 is a top plan view of the closure plate;

FIG. 7 is a top plan view of the closure plate fully inserted into the body;

FIG. 8 is a reduced top plan view of a sleeve having tightening straps;

FIG. 9 is a reduced side elevation view of the sleeve;

FIG. 10 is a reduced bottom plan view of the sleeve showing a compressible seal;

FIG. 15 is a top plan view of the plumbing coupling showing the closure plate filly inserted into the body and the sleeve tightly wrapped around the body and closure plate;

FIG. 16 is a top plan view of the plumbing coupling showing two inner tightening straps disengaged and peeled back to allow removal of the closure plate;

FIG. 19 is a perspective view of FIG. 16 showing how the middle portion of the sleeve is peeled back to allow insertion or removal of the closer plate.

MODES FOR CARRYING OUT THE INVENTION

Figure 14:
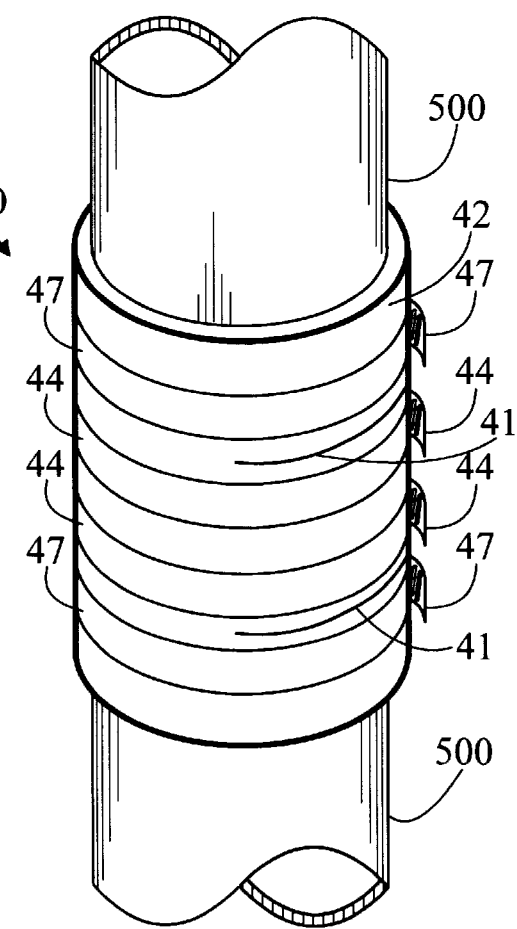
FIG. 14 is a reduced perspective of the plumbing coupling showing the sleeve wrapped around the body.

Referring initially to FIGS. 14, 15, and 16 there are illustrated reduced perspective and two top plan views respectively of a plumbing coupling in accordance with the present invention, generally designated as 20. Now referring to FIGS. 1 through 4, there are illustrated top plan, front elevation, side elevation, and cross sectional view respectively of a substantially cylindrical body 22 of plumbing coupling 20. Body 22 has an inner surface 24, an outer surface 26, an outer perimeter 28, a longitudinal axis 30, an inner diameter Di, and an outer diameter Do. Body 22 is fabricated from a resilient material, neoprene rubber being preferred. Body 22 further includes a through-slit 32 which is oriented substantially perpendicular to longitudinal axis 30. Through-slit 32 penetrates the wall of body 22, and partially extends around outer perimeter 28, and defines a chord 33 having a length L. In a preferred embodiment, through-slit 32 extends between one-half and one-fourth of the way around outer perimeter 28. To maximize the strength of plumbing coupling 20, the shortest possible through-slit 32 is desired, consistent with the resiliency of body 22. Inner surface 24 of body 22 includes a compressible circumferential lip 34, which extends around inner surface 24 to meet through-slit 32.

Referring now to FIGS. 5 and 6 there are illustrated side elevation and top plan views respectively of a closure plate 36 having an edge 38. Also referring to FIG. 7, there is illustrated a top plan view of closure plate 36 fully inserted into body 22 in direction 40. Closure plate 36 is selectively receivable by through-slit 32, so that when closure plate 36 is fully inserted into through-slit 32, edge 38 of closure plate 36 compressively abuts inner surface 24 of body 22, and thereby blocks the flow of water through the body 22 of plumbing coupling 20. That is, edge 38 of closure plate 36 presses against or abuts compressible lip 34 of inner surface 24 and forms a watertight seal. In a preferred embodiment, closure plate 36 includes a first portion having a diameter D1 which is slightly greater than outer diameter Do of body 22, and a second portion having a diameter D2 which is less than outer diameter Do of body 22. Diameter D2 is designed to abut lip 34 of inner surface 24, while diameter D1 is designed to extend slightly beyond outer diameter Do so that it can form a compressive seal with a sleeve 42 which is installed around body 22. In a preferred embodiment, closure plate 36 has a width W which is greater than the length L of chord 33 formed by through-slit 32. Therefore, as closure plate 36 is inserted, through-slit 36 must longitudinally stretch to accept closure plate 36 (also refer to FIG. 12).

FIG. 8 is a reduced top plan view of a sleeve 42 having a plurality of tightening straps. In a preferred embodiment, two inner straps 44 and two outer straps 47 are utilized. Tightening straps 44 and 47 can be of any convenient design such as the shown hose clamp variety. Sleeve 42 has a longitudinal axis 39 and two longitudinal slits 41 disposed on opposite sides of longitudinal axis 39, the two slits 41 defining a separately movable middle portion 43 of sleeve 42. Inner straps 44 are connected to middle portion 43 of sleeve 42.

FIG. 9 is a reduced side elevation view of sleeve 42, and FIG. 10 is a reduced bottom plan view of sleeve 42 showing a compressible seal 46 which is centrally disposed along longitudinal axis 39. Sleeve 42 is selectively connectable around perimeter 28 of body 22, and when so installed compressively abuts the exposed edge 38 of closure plate 36 (refer also to FIGS. 13–15). Sleeve 42 has a compressible seal 46, such as fabricated from rubber, so that compressible seal 46 abuts edge 38 of closure plate and forms a water tight seal. In a preferred embodiment, sleeve 42 is fabricated from thin gauge stainless steel.

Figure 11:
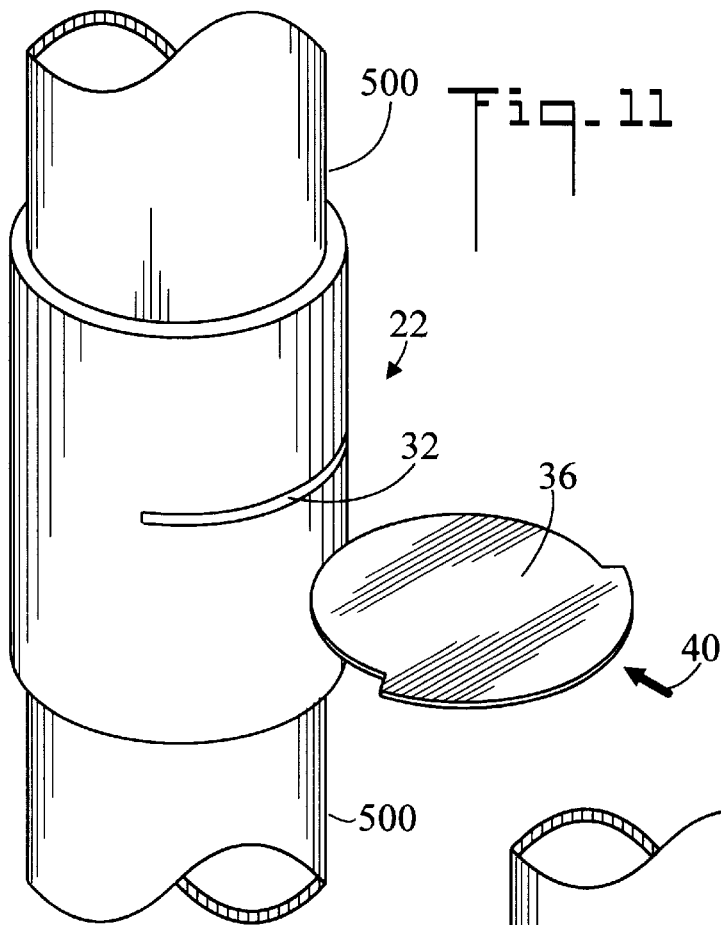
FIG. 11 is a reduced perspective view of the body and closure plate, the body installed between two sections of pipe.

FIG. 11 is a reduced perspective view of body 22 and closure plate 36, wherein body 22 is installed between two proximate sections of longitudinally aligned pipe 500. Inner diameter Di of body 22 of plumbing coupling 20 is sized to receive the two pipes 500. Closure plate 36 is positioned to be inserted in direction 40 into through-slit 32 of body 22.

Figure 12:
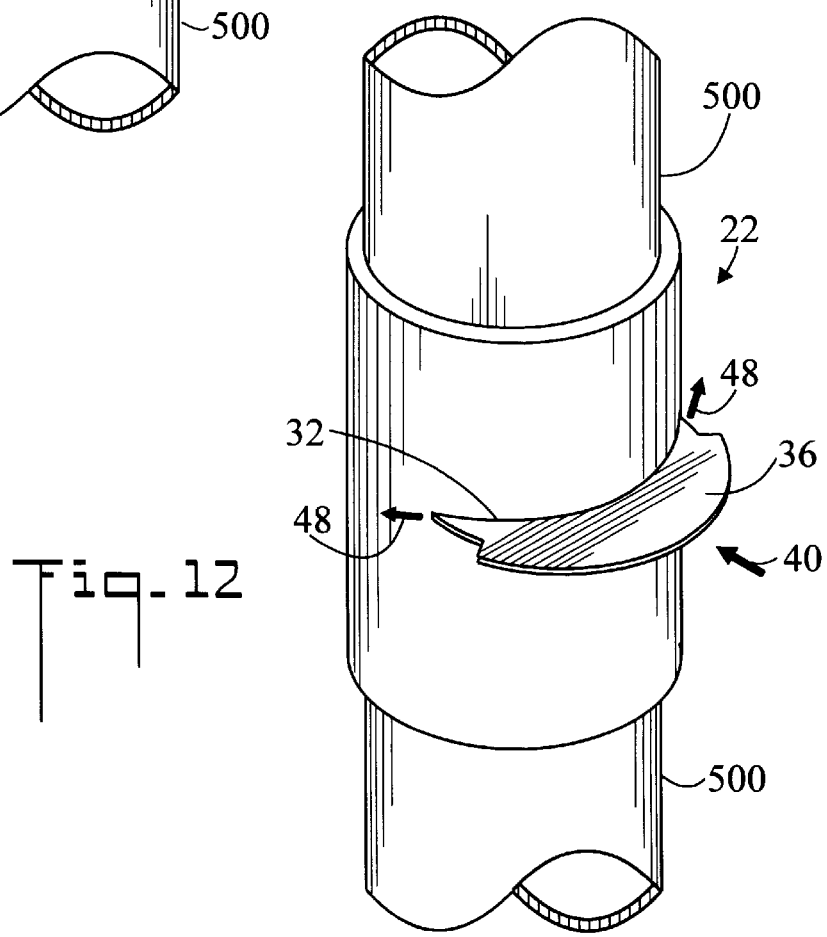
FIG. 12 is a reduced perspective view of the body with the closure plate partially inserted into a through-slit in the body.

FIG. 12 is a reduced perspective view of body 22 with closure plate 36 partially inserted into through-slit 32. Since the width W of closure plate 36 is greater than the length L of through-slit 32 (refer also to FIGS. 1 and 6), through-slit 32 must longitudinally stretch in directions 48 to allow passage of closure plate 36. This is of course made possible by the resilient nature of body 22.

Figure 13:
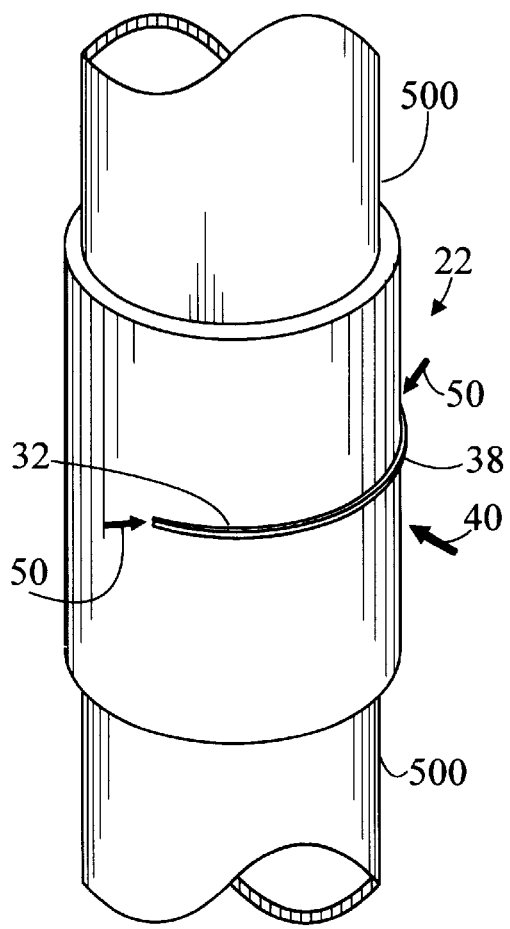
FIG. 13 is a reduced perspective view of the body with the closure plate fully inserted.

FIG. 13 is a reduced perspective view of body 22 with closure plate 36 fully inserted into through-slit 32. Through-slit 32 has resiliently returned in directions 50 to its normal pre-insertion size. Referring also to FIG. 6, it may be appreciated that by reducing width W of closure plate 36 it is possible to insert the plate in through-slit 32 without stretching. In so doing however, the width of lip 34 would have to be correspondingly increased so that closure plate 36 would still compressibly abut lip 34 to form a watertight seal.

FIG. 14 is a reduced perspective view of complete plumbing coupling 20 showing sleeve 42 and tightening straps 44 and 47 wrapped around body 22, and FIG. 15 is a top plan view of plumbing coupling 20 showing closure plate 36 fully inserted into through-slit 32 in body 22 and sleeve 42 tightly wrapped around body 22 and closure plate 36. In the fully inserted position, the inside portion (smaller diameter) of closure plate 36 snugly abuts lip 34 of inner surface 24, and the outside portion (larger diameter) abuts compressible seal 46 of sleeve 42, thereby forming a watertight seal all around closure plate 36 and preventing the flow of water through the plumbing coupling 20.

FIG. 16 is a top plan view of the plumbing coupling 20 showing the two inner tightening straps 44 disengaged and middle portion 43 of sleeve 42 peeled back in direction 49 to allow removal of the closure plate 36 in direction 48, or insertion of closure plate 36 in direction 40. That is, outer tightening straps 47 of sleeve 42 can remain tightly secured during the removal or insertion process.

Figure 17:
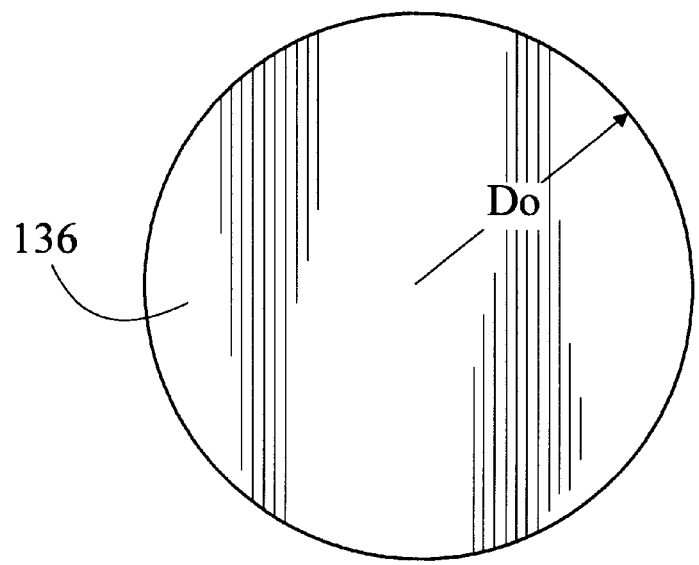
FIG. 17 is an alternate embodiment of the closure plate.

FIG. 17 is an alternate embodiment of the closure plate, generally designated as 136. In this embodiment closure plate 136 is substantially circular, and has an outer diameter substantially equal to the outer diameter Do of body 22. In other words, closure plate 136 is not specially contoured to fit inner surface 24 and to extend slightly past outer diameter Do as is closure plate 36. Nonetheless, the resiliency of body 22 allows it to form around closure plate 136 and effect a watertight seal.

Figure 18:
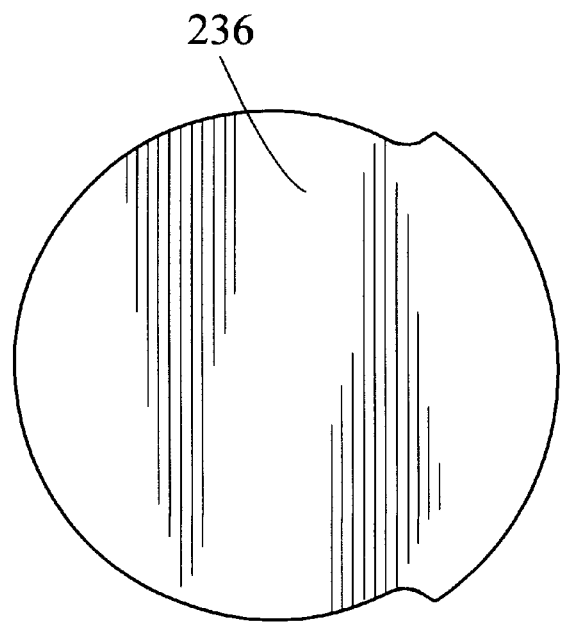
FIG. 18 is another alternate embodiment of the closure plate.

FIG. 18 is another alternate embodiment of the closure plate, generally designated as 236. Closure plate 236 is further contoured to better fit against the transition between inner surface 24 and outer surface 26 of body 22.

FIG. 19 is a perspective view of FIG. 16 showing how middle portion 43 of sleeve 42 is peeled back in direction 49 to allow insertion or removal of closure plate 36.

Plumbing coupling 20 is used to test a plumbing drainage system by installing body 22 between two pipes 500. Then inserting closure plate 36 into through-slit 32 so that edge 38 abuts compressible circumferential lip 34 of surface 24. Sleeve 42 is then installed and tightened around body 22 using tightening straps 44 and 47. One of the two pipes and the system to which it is connected is then pressure tested. After testing, inner tightening straps 44 are untightened and disengaged and middle portion 43 of sleeve 42 is peeled back allowing access to closure plate 36. Closure plate 36 is then removed from through-slit 32, and middle portion 43 of sleeve 42 is retightened around body 22 using inner tightening straps 44. Plumbing coupling 20 then becomes a permanent member of the plumbing system.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method of testing a plumbing drainage system including two proximate and longitudinally aligned pipes, comprising:

providing a plumbing coupling having a cylindrical resilient body having an inner surface, an outer surface, an outer perimeter, and a longitudinal axis, said body having a through-slit oriented substantially perpendicular to said longitudinal axis, said through-slit partially extending around said outer perimeter, a closure plate selectively receivable by said through-slit, said closure plate having an edge, and a sleeve selectively connectable around said perimeter of said body, said sleeve having two longitudinal slits defining a middle portion;

installing said body between the two pipes;

inserting said closure plate into said through-slit so that said edge of said closure plate abuts said inner surface;

installing said sleeve around said body and tightening said middle portion of said sleeve around said body using said inner tightening strap;

pressure testing one of the pipes:

disengaging one end of said inner tightening strap from the other end of said inner tightening strap and peeling back said middle portion of said sleeve and said inner tightening strap with one end of said inner tightening strap connected to said sleeve;

removing said closure plate from said through-slit; and using said inner tightening strap to retighten said middle portion of said sleeve around said body.

2. A plumbing coupling, comprising:

a substantially cylindrical body having an inner surface, an outer surface, an outer perimeter, and a longitudinal axis;

said body having a through-slit oriented substantially perpendicular to said longitudinal axis, said through-slit partially extending around said outer perimeter;

a closure plate selectively receivable by said through-slit, said closure plate having an edge;

so that when said closure plate is fully inserted into said through-slit, said edge of said closure plate abuts said inner surface;

a sleeve selectively connectable around said perimeter of said body;

said sleeve having a compressible seal so that said compressible seal abuts said edge of said closure plate;

said sleeve having a longitudinal axis; and, said sleeve having two longitudinal slits disposed on opposite sides of said longitudinal axis, said slits defining a middle portion of said sleeve;

an inner tightening strap connected to said middle portion;

said inner tightening strap selectively connectable to itself around said perimeter of said body by engaging one end of said inner tightening strap with another end of said inner tightening strap;

wherein said inner tightening strap may be disengaged and said middle portion and said inner tightening strap may be peeled back with one end of said inner tightening strap connected to said sleeve to allow removal or insertion of said closure plate.

* * * * *